United States Patent [19]

Isaka et al.

[11] Patent Number: 5,610,646
[45] Date of Patent: Mar. 11, 1997

[54] IMAGE FORMING APPARATUS HAVING IMPROVED RESOLUTION SWITCHING CAPABILITIES

[75] Inventors: Yukio Isaka; Yoji Serizawa, both of Yokohama; Akio Noguchi, Ebina; Yukihide Ushio; Seiji Uchiyama, both of Tokyo; Kazuro Yamada; Makoto Takeuchi, both of Yokohama, all of Japan

[73] Assignee: Canon Kabushiki Kaisha, Tokyo, Japan

[21] Appl. No.: 458,259

[22] Filed: Jun. 2, 1995

Related U.S. Application Data

[62] Division of Ser. No. 578,443, Sep. 7, 1990.

[30] Foreign Application Priority Data

| Sep. 7, 1989 | [JP] | Japan | 1-233661 |
| Sep. 11, 1989 | [JP] | Japan | 1-236312 |
| Oct. 26, 1989 | [JP] | Japan | 1-277257 |
| Jan. 30, 1990 | [JP] | Japan | 2-17882 |

[51] Int. Cl.$^6$ .................................................. H04N 1/21
[52] U.S. Cl. ........................ 347/131; 358/298; 347/251
[58] Field of Search .................................. 347/131, 251, 347/252, 253; 358/298

[56] References Cited

U.S. PATENT DOCUMENTS

| 3,932,035 | 1/1976 | Sato et al. | 355/277 |
| 4,107,786 | 8/1978 | Masaki et al. | 364/900 |
| 4,130,841 | 12/1979 | Walsh et al. | 358/298 |
| 4,393,387 | 7/1983 | Kitamura | 346/108 |
| 4,734,715 | 3/1988 | Shiraishi | 346/108 |
| 4,761,662 | 8/1988 | Yoshimoto | 346/108 |
| 4,809,025 | 2/1989 | Noguchi | 346/154 |
| 4,847,643 | 7/1989 | Ohmori | 346/160 |
| 4,862,288 | 8/1989 | Sekiya | 358/298 |
| 4,872,025 | 10/1989 | Sekiya et al. | 346/108 |
| 4,876,562 | 10/1989 | Suzuki et al. | 346/160 |
| 4,910,532 | 3/1990 | Hiraguchi | 346/108 |
| 4,926,200 | 5/1990 | Ohyama et al. | 346/108 |
| 4,935,615 | 6/1990 | Eiichi et al. | 250/205 |
| 4,952,948 | 8/1990 | Suzuki et al. | 346/150 |
| 4,989,096 | 1/1991 | Webb et al. | 358/298 |
| 4,993,772 | 2/1991 | Ikenoue et al. | 358/300 |
| 5,006,705 | 4/1991 | Saito et al. | 346/108 |
| 5,012,293 | 4/1991 | Aldrich et al. | 355/274 |
| 5,043,745 | 8/1991 | Inoue et al. | 346/108 |
| 5,140,349 | 8/1992 | Abe et al. | 346/160 |
| 5,157,417 | 10/1992 | Anzai | 346/108 |
| 5,258,779 | 11/1993 | Serizawa et al. | 346/108 |
| 5,262,801 | 11/1993 | Serizawa et al. | 346/108 |
| 5,361,329 | 11/1994 | Morita et al. | 346/108 |

FOREIGN PATENT DOCUMENTS

| 3618031 | 1/1987 | Germany . |
| 3736334 | 5/1988 | Germany . |
| 3810894 | 10/1988 | Germany . |
| 3925143 | 2/1990 | Germany . |

*Primary Examiner*—Mark J. Reinhart
*Attorney, Agent, or Firm*—Fitzpatrick, Cella, Harper & Scinto

[57] ABSTRACT

An image forming apparatus comprises image information which outputs a sync signal and means generated image information synchronously with the sync signal; image forming means form an image on the basis of the image information at either one of a plurality of resolutions and which generates a sync request signal to request a transmission of the sync signal; and a resolution changeover means. When the image forming unit received the resolution change over request signal before the sync request signal is generated, the image forming unit executes the switching operation of the resolution, and if the image forming unit received the resolution changeover request signal after the sync request signal had been generated, the image forming unit does not execute the switching operation of the resolution.

7 Claims, 16 Drawing Sheets

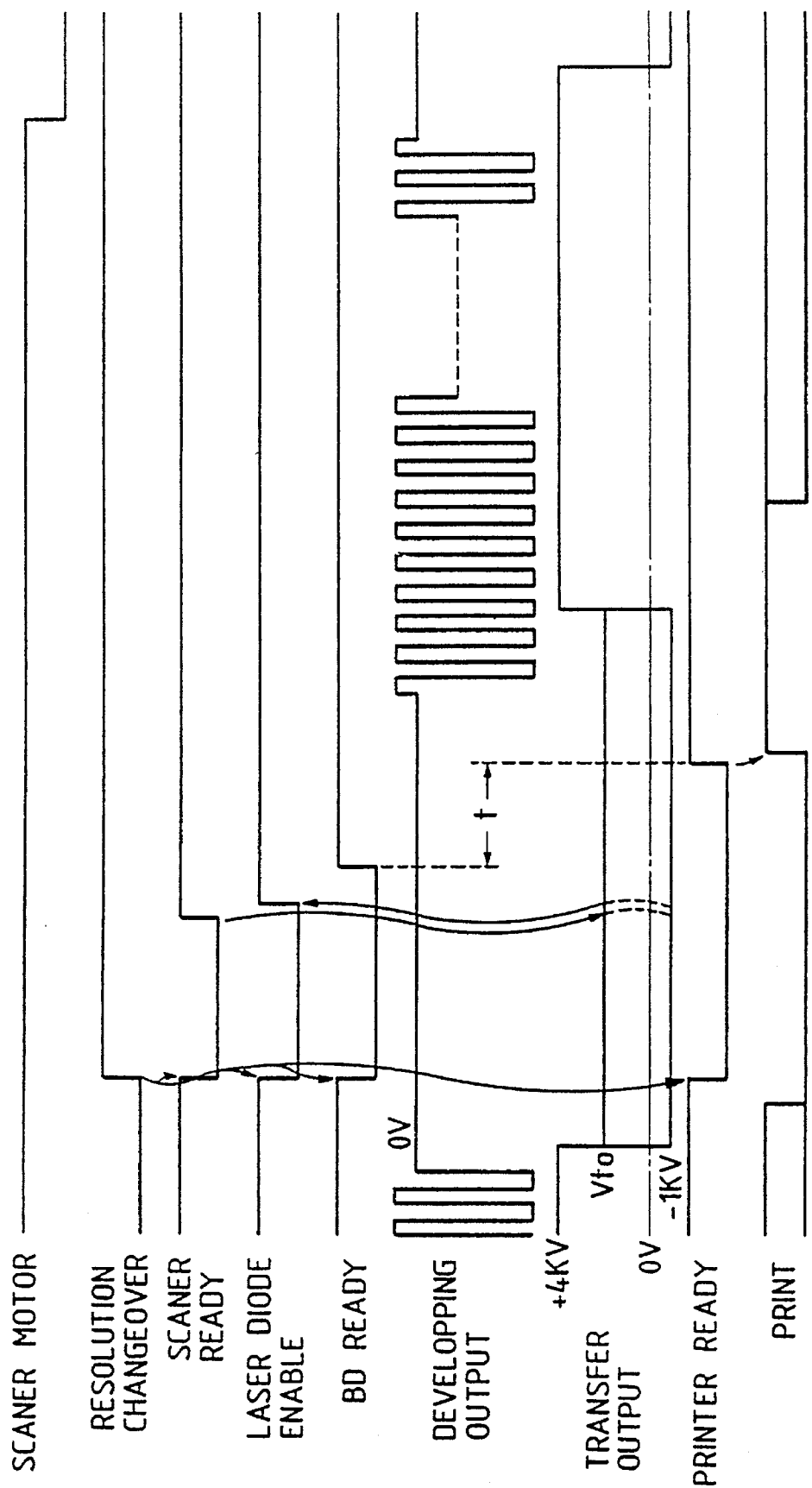

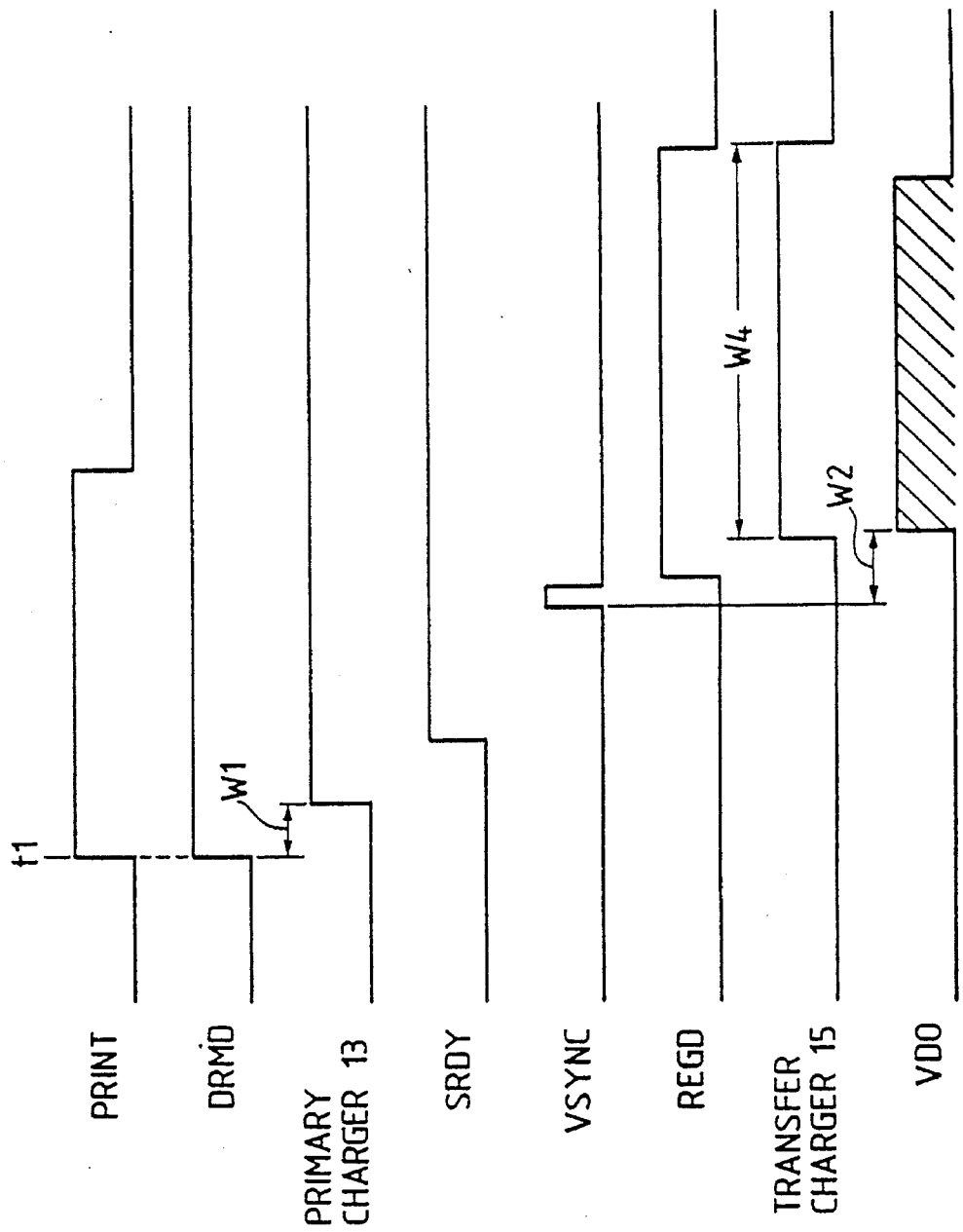

IMAGE FORMING APPARATUS HAVING IMPROVED RESOLUTION SWITCHING CAPABILITIES

This application is a continuation of application Ser. No. 07/578,443 filed Sep. 7, 1990, pending.

BACKGROUND OF THE INVENTION

1. Field of the Invention

The present invention relates to an image forming apparatus such as a laser printer to form an image by pixels and, more particularly, to an image forming apparatus in which a plurality of resolutions are selectively switched and an image can be printed.

2. Related Background Art

Hitherto, for instance, a laser beam printer has been known as such a kind of apparatus. A printer engine unit of the apparatus has a construction as shown in FIG. 1.

In FIG. 1, reference numeral 1 denotes a photo sensitive drum as an electrostatic latent image carrier; 2 indicates a semiconductor laser; 3 a developing device for depositing a toner to an electrostatic latent image and for visualizing; 4 a rotary polygon mirror to scan a beam which is emitted from the semiconductor laser 2 onto the photo sensitive drum 1; 5 a charger; 6 a transfer charger to copy transfer a toner image onto a print paper 10; 7 a fixing device to fix the toner which was transferred onto the print paper 10; and 8 resist rollers for correcting the oblique movement of the paper which was fed by a paper feed roller 9 by once abutting the paper to the rollers and for adjusting the front edge of the page and the image print start timing of the laser. Reference numeral 12 denotes a cleaner to clean the surface of the photo sensitive drum 1 and 14 indicates a scanner motor to drive the polygon mirror 4.

To switch a resolution in the printer having such a construction, for instance, it is necessary to switch a rotational speed of the scanner motor 14 and to switch a period of image clock corresponding to one dot of the turn-on/off of the semiconductor laser 2. In the conventional switching method, a switch or the like provided for the printer is detected at the time of the turn-on of the power source and the resolution is switched when the printer is made operative.

Therefore, the resolution cannot be switched in a state of the power ON.

On the other hand, FIG. 2 shows a system in which the resolution is switched by a resolution changeover request command which is sent from a controller 30 as a generation source of image information. In FIG. 2, reference numeral 20 denotes a command which is sent from the controller 30 to a printer engine 34 and 21 indicates a status which is contrarily sent from the printer engine 34 to the controller 30. The command and status signals are communicated asynchronously with an image signal. Reference numeral 23 denotes a timing signal of the image signal. A horizontal sync signal (well-known beam detection signal) and a vertical sync request signal are sent from the printer engine 34 to the controller 30. The vertical sync signal is sent from the controller 30 to the printer engine 34. When the controller 30 receives the vertical sync request signal from the printer engine 34, the controller 30 sends a vertical sync signal to the printer engine 34 and, thereafter, sends image data 26 of one line synchronously with a horizontal sync signal from the printer engine 34 and with an image clock 27.

On the basis of the image data 26, the semiconductor laser 2 in an optical system unit 33 of the printer engine 34 is turned on and off. A laser beam emitted from the laser 2 scans on the photo sensitive drum 1 by the polygon mirror, thereby forming an image.

In addition to the optical system unit 33, the printer engine 34 also includes: a scanner motor driver 32 to drive the scanner motor; and a CPU 31 to drive and control the photo sensitive drum 1, scanner motor 14, and the like.

When the controller 30 outputs a resolution changeover request command as a command 20, the printer engine 34 finishes the delivery of the paper which is at present being printed and changes a rotational speed of the scanner motor 14 to a predetermined value and, thereafter, restarts the paper feeding operation.

However, in the conventional example, in the case of switching the resolution by the detection of the switch at the time of the turn-on of the power source, the resolution corresponding to the switch is set simultaneously with the start of the operation of the printer. Therefore, for instance, the resolution cannot be switched every page and the like. The requests from the controller 30 cannot be sufficiently satisfied.

On the other hand, even in a printer which can switch the resolution by the command 20 from the controller 30, after the paper 10 which is at present being printed had been once delivered and the rotational speed of the scanner was changed, the paper feeding operation is started. Thus, a throughput largely deteriorates due to the switching of the resolution.

Further, the above conventional technique has a drawback such that when the print paper 10 has once been fed, the resolution for the paper 10 cannot be switched, so that it is difficult for the controller 30 to process such a situation.

In the above image forming apparatus, a predetermined amount of laser beam is emitted in order to obtain the foregoing beam detection signal (hereinafter, referred to as a "BD signal") as a horizontal sync signal serving as a reference of the image forming position in the main scanning direction.

However, due to the light emission to detect the BD signal, for instance, an image of about two lines is formed as an electrostatic latent image into an image effective area on the photo sensitive drum 1. Such an unnecessary electrostatic latent image which is not an inherent copy transfer image is also developed as a toner image and the toner is transferred from the drum 1 to the transfer charger 6.

That is, hitherto, when the rotational speed of the scanner motor 14 is changed in order to switch the resolution, an unnecessary toner image is certainly formed when the BD signal is detected.

In the case of the system such that the transfer charger 6 is used upon transfer, the toner drops to a region around the transfer charger 6 and becomes a cause of a failure of the transfer charger 6 or a deterioration of the performance thereof.

In the system in which a transfer roller (not shown) is used in place of the transfer charger 6, the toner image is directly transferred to the transfer roller.

Such a fouling of the toner onto the transfer roller causes an inconvenience such that even if an amount of toner which is deposited onto the transfer roller is very small, what is called a "back surface dirt" of a recording medium occurs by the elapse of time.

On the other hand, in a recording apparatus which can print images to both surfaces of a paper, such a "back surface dirt" becomes a dirt of the recording surface and causes an inconvenience such that the recording picture quality is remarkably deteriorated.

SUMMARY OF THE INVENTION

It is an object of the invention to solve the foregoing technical subjects.

Another object of the invention is to solve various problems occurring by the switching of the resolution.

Still another object of the invention is to provide an image forming apparatus which can minimize a reduction in throughput occurring by the switching of the resolution.

According to a preferred embodiment of the invention, a light beam is scanned by using a polygon mirror and a rotational speed of a scanner motor is switched when the resolution is switched.

It is, therefore, further another object of the invention to solve various problems which occur by the switching of the rotational speed of the scanner motor.

The above and other objects and features of the present invention will become apparent from the following detailed description and the appended claims with reference to the accompanying drawings.

BRIEF DESCRIPTION OF THE DRAWINGS

FIG. 9 is an operation timing chart in the fourth embodiment;

FIG. 17 is an operation timing chart in the sixth embodiment.

DETAILED DESCRIPTION OF THE PREFERRED EMBODIMENTS

Preferred embodiments according to the present invention will be described in detail hereinbelow with reference to the drawings.

(First embodiment)

Figure 3:
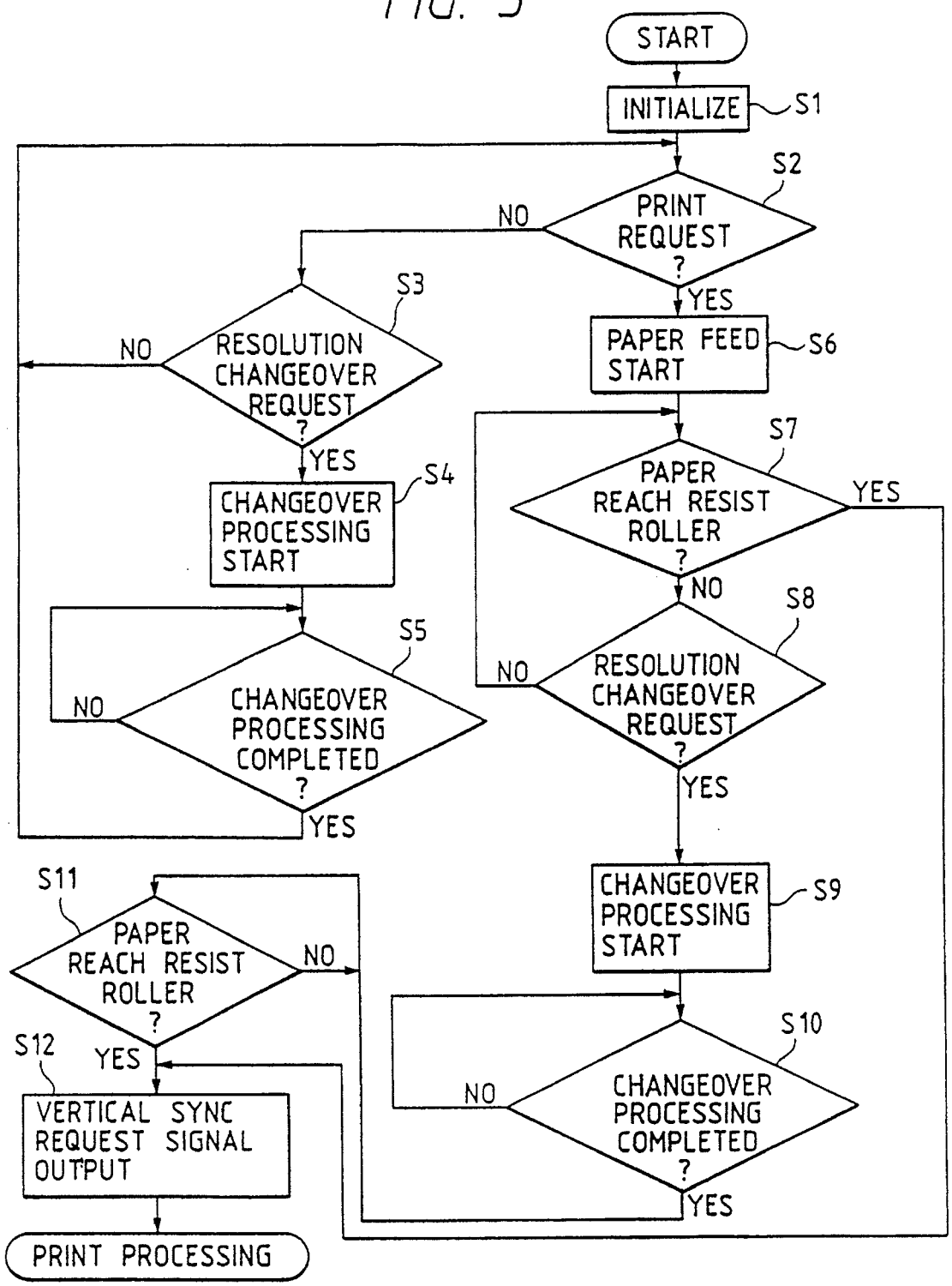
FIG. 3 is a control flowchart of the printer engine section in the first embodiment.

FIG. 3 is a control flowchart of the printer engine 34 showing the first embodiment according to the invention.

Figure 1:
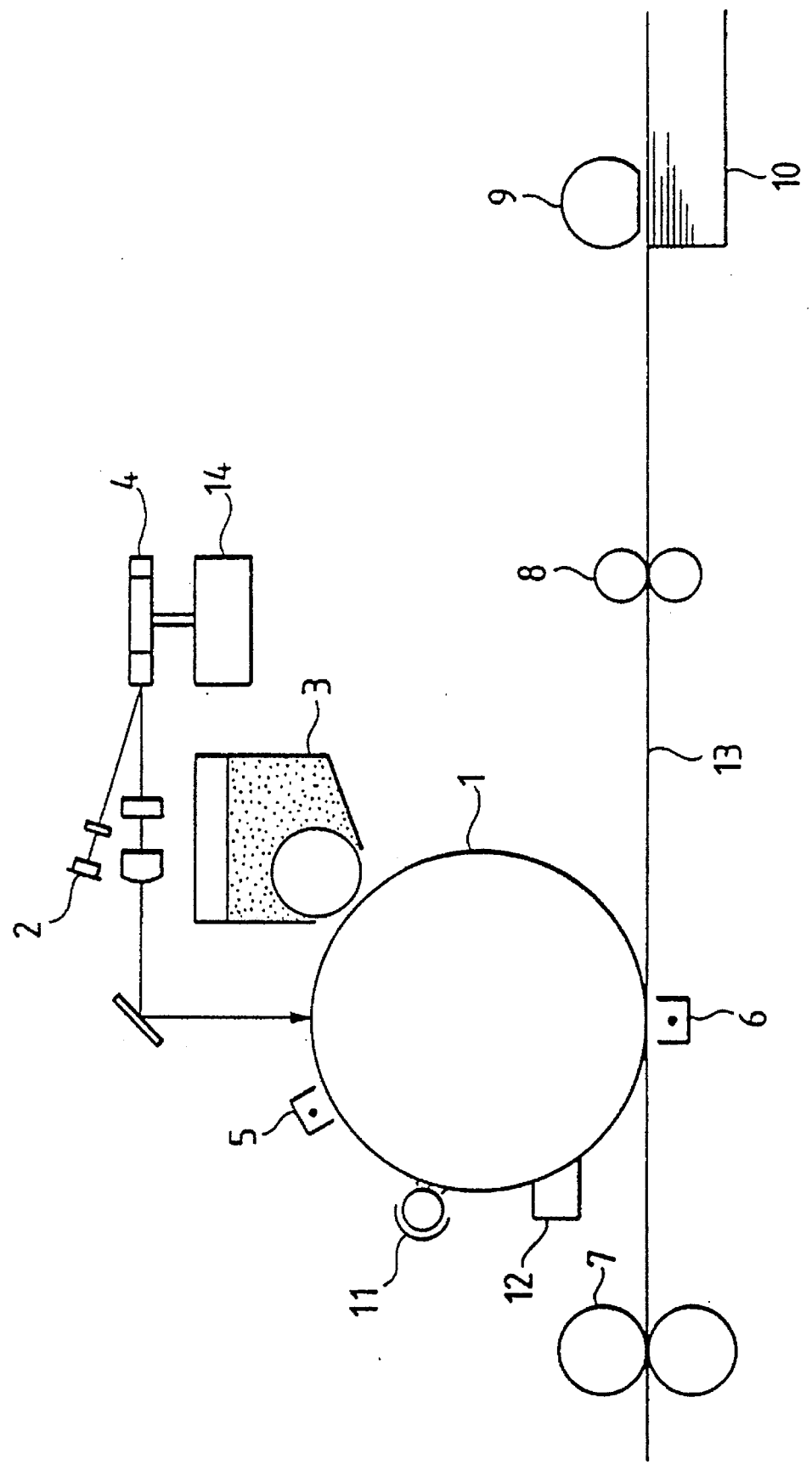
FIG. 1 is a diagram showing a construction of a printer engine section in each of the conventional example and the first and second embodiments.
Figure 2:
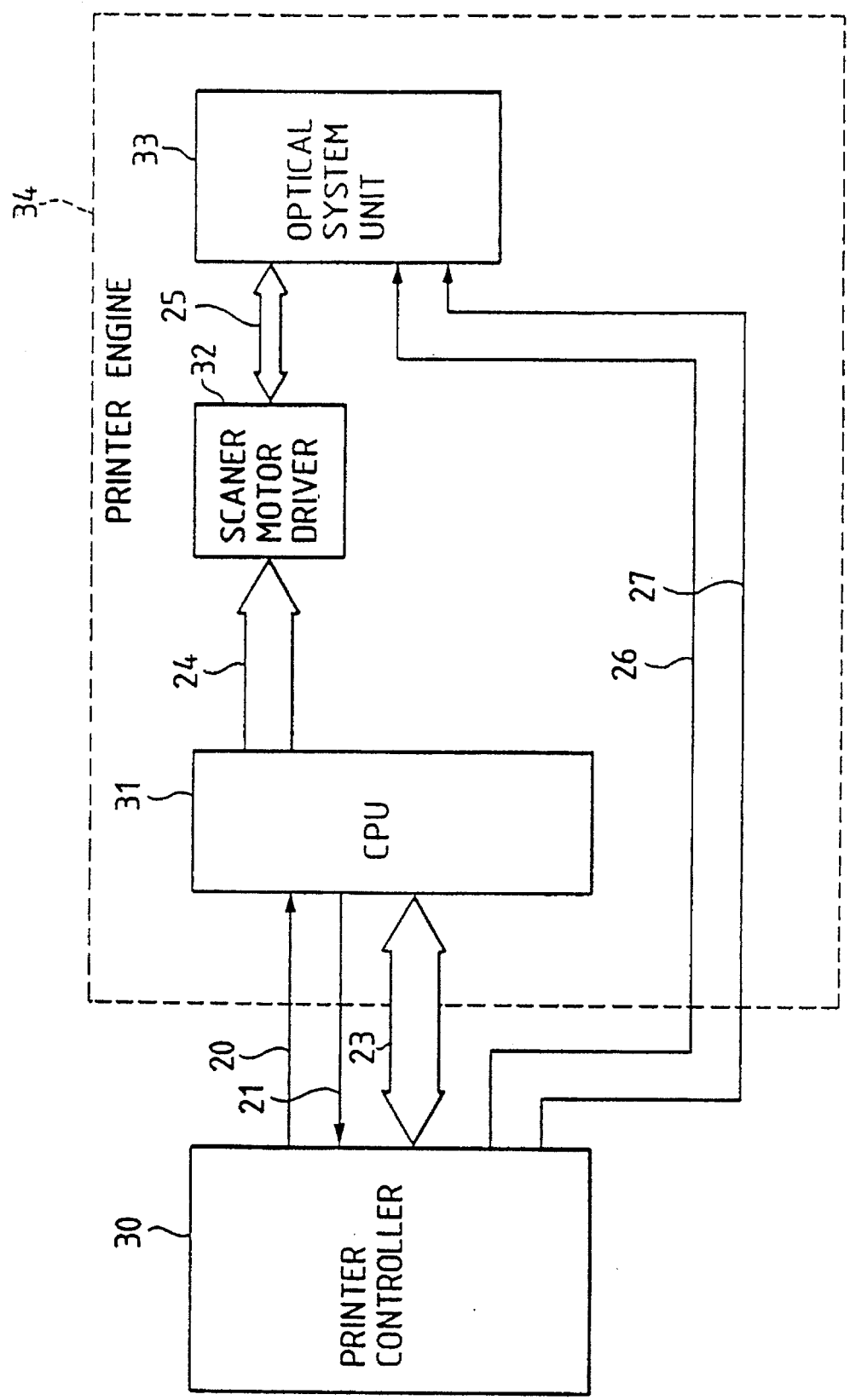
FIG. 2 is a diagram showing a construction of an image recording apparatus in each of the conventional example and the first and second embodiments.

A construction of a whole apparatus is similar to the constructions shown in FIGS. 1 and 2 which have already been described with respect to the conventional example and, therefore, its description is omitted here.

An algorithm to switch a resolution when the first page is printed will now be described.

First, when a power source of a printer is turned on, the self initialization processing is executed in step S1 in FIG. 3. After completion of the processing, step S2 follows. In step S2, a check is made to see if a print request signal has been output from the controller 30 or not. If NO, step S3 follows and a check is made to see if a resolution changeover request signal has been output or not. If YES in step S3, step S4 follows and a processing to switch to the requested resolution, for instance, a processing to set the rotational speed of the scanner motor 14 is performed. In step S5, a check is made to see if the changeover processing has been completed or not. If YES in step S5, the processing routine is returned to step S2 and the apparatus waits for the reception of a print request signal.

If the resolution changeover signal is received after the print request signal was received, the processing routine advances from step S2 to step S6 and the paper feeding operation by the paper feed roller 9 is started. After that, in steps S7 and S8, checks are always made to see if a paper has reached the resist rollers 8 or not and to see if the resolution changeover signal has been transmitted or not. If the resolution changeover signal is not received for a period of time when the paper reaches the resist rollers 8, the processing routine advances to step S12. In step S12, in a manner similar to the ordinary print, a vertical sync request signal is output to the controller and the image print processing is started.

However, if the resolution changeover signal was received before the paper reaches the resist rollers 8, step S9 follows and the resolution changeover processing is soon started. In step S10, a check is made to see if the changeover processing has been completed or not. If YES, step S11 follows and a check is made to see if the paper has reached the resist rollers 8 or not. If NO in step S11, the apparatus waits until the paper reaches the resist rollers 8. After that, if the paper has arrived at the resist rollers 8, the processing routine advances to step S12 and the foregoing print processing is executed. However, if the resolution changeover processing is not finished even after the paper has reached the resist rollers 8, the paper is held and stopped at the position of the resist rollers 8 until the changeover processing is completed. That is, in the first embodiment, if the changeover processing is not finished, the paper is held at the position of the resist rollers 8, thereby controlling so as not to output the vertical sync request signal.

(Second embodiment)

Figure 4:
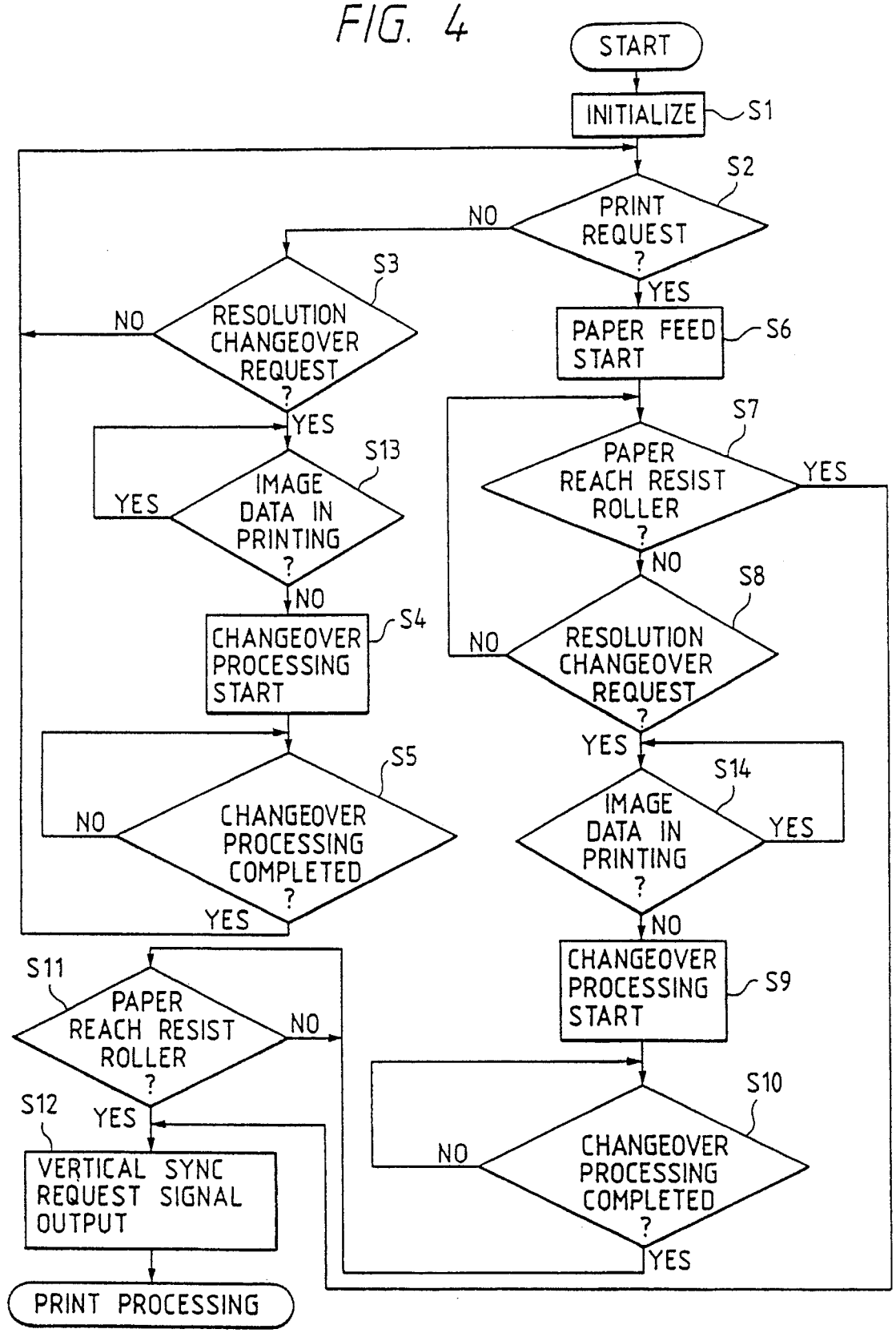
FIG. 4 is a control flowchart of the printer engine section in the second embodiment.

The second embodiment according to the invention will now be described hereinbelow in accordance with a control flowchart shown in FIG. 4.

A construction of a whole apparatus is similar to the constructions shown in FIGS. 1 and 2 which have already been described in the conventional example and, therefore, its description is omitted here. The same processings as those in the first embodiment are designated by the same step numbers.

An algorithm in the case where the resolution changeover signal was received during the continuous printing operation will now be shown here.

Similarly to the first embodiment, the paper feeding operation is started during the continuous printing operation (step S6). Checks are made to see if the paper has reached the resist rollers 8 or not and to see if the resolution changeover request signal has been sent or not (steps S7 and S8). If the resolution changeover request signal is not received until the paper reaches the resist rollers 8, the vertical sync request signal is output (step S12) in a manner similar to the ordinary case. However, if the resolution changeover request signal was received before the paper reaches the resist rollers 8, a check is made to see if an image has been printed at this time point or not (step S14). If YES in step S14, the apparatus waits until the completion of the image print processing.

After that, the resolution changeover processing is started. Then, checks are made to see if the changeover processing has been completed or not and to see if the paper has reached the resist rollers 8 or not (steps S10, S11). If the changeover processing had been completed at the time point when the paper has reached the resist rollers 8, the vertical sync request signal is output at the ordinary timing. On the contrary, if the changeover processing is not finished at the time point when the paper has reached the resist rollers 8, the print paper is held at the position of the resist rollers 8 until the changeover processing is finished. After completion of the changeover processing, the vertical sync request signal is output.

(Third embodiment)

Figure 5:
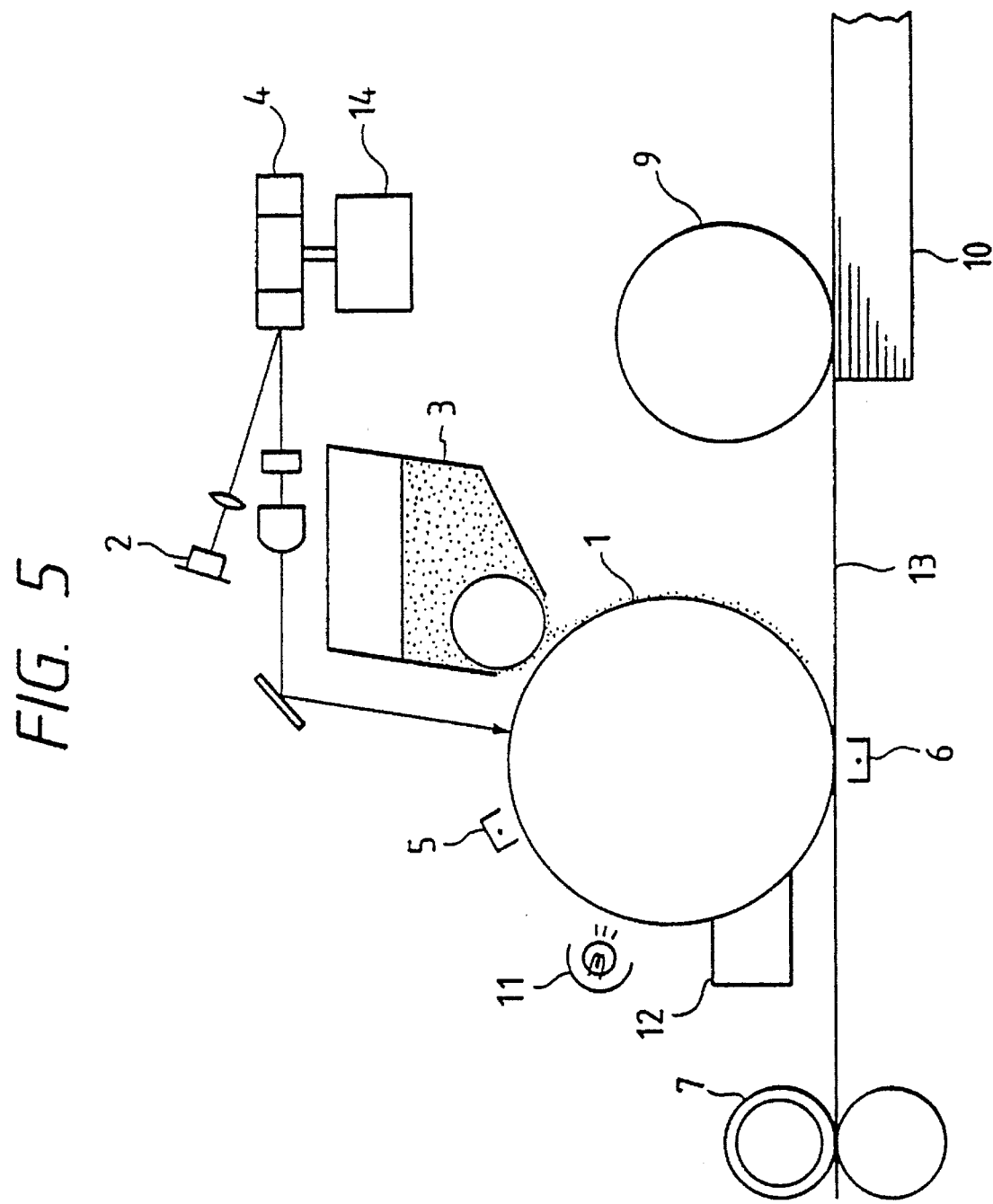
FIG. 5 is a diagram showing a construction of a printer engine section in the third embodiment.

FIG. 5 is a diagram showing a structure of a printer engine section in the third embodiment according to the invention. In the third embodiment, the resist rollers 8 used in the foregoing embodiments and the conventional example do not exist and only the paper feed roller 9 exists between the paper cassette 10 and the photo sensitive drum 1.

Figure 6:
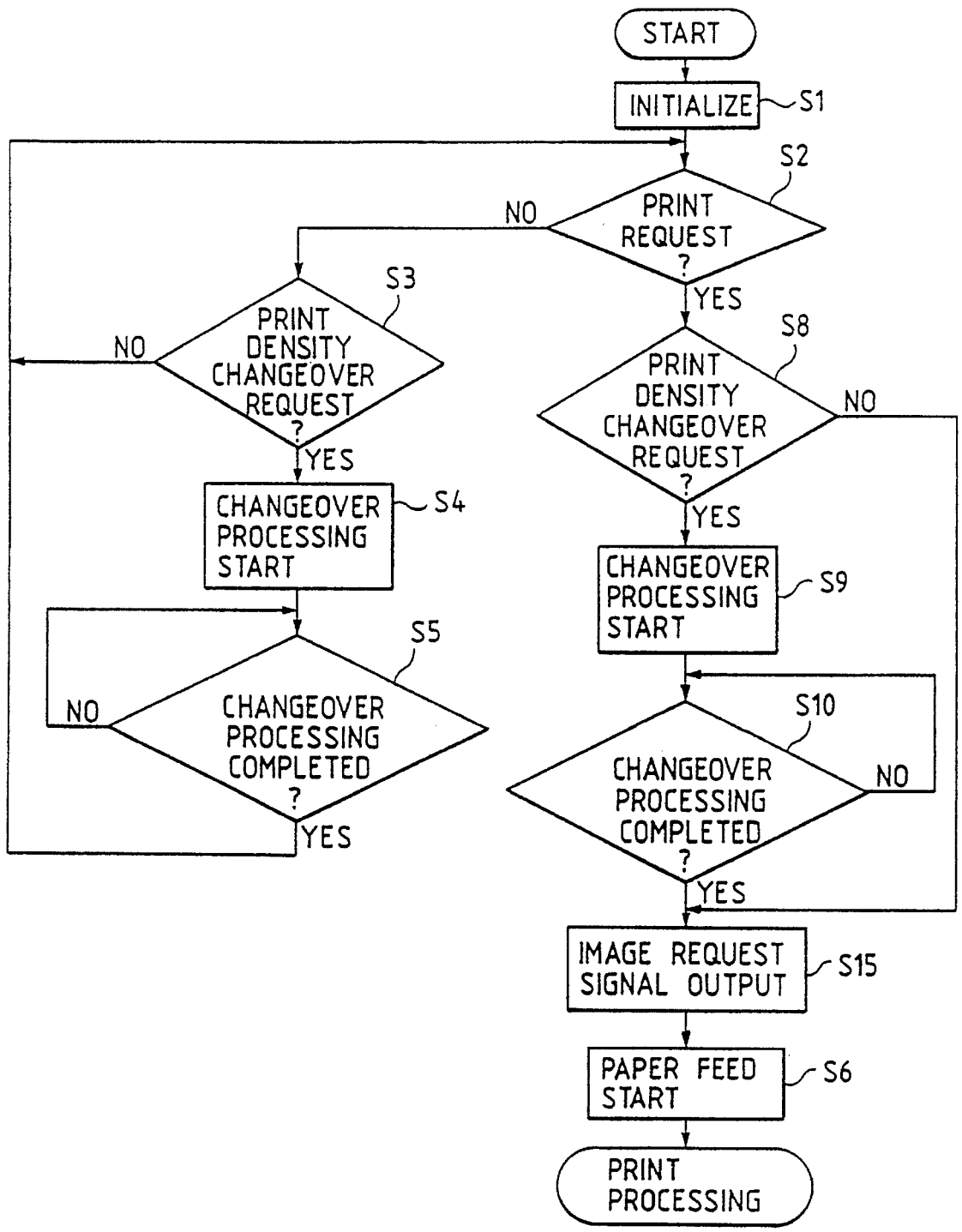
FIG. 6 is a control flowchart of the printer engine section in the third embodiment.

An algorithm of the resolution changeover in such a paper feeding system will now be described with reference to a flowchart of FIG. 6. In the third embodiment, the same processings as those in the first and second embodiments are designated by the same step numbers.

First, if the resolution changeover request signal is received in a state in which a print request signal is not received from the controller (not shown), that is, in a standby state, the processing necessary to switch the resolution is soon started (steps S3, S4). After completion of the changeover processing, a check is again made to see if the print request signal has been received or not (step S2).

If the resolution changeover request signal has been received after the print request signal had been output from the controller, the resolution changeover processing is first started (step S9). The paper feeding operation is stopped until all of the processing which are necessary for the resolution changeover are finished. After completion of the changeover processing (step S10), an image request signal is output to the controller (step S15) and the paper feeding operation is started (step S6).

On the other hand, if the resolution changeover request signal is not received when the print request signal was sent, the image request signal is immediately output and the paper is fed.

According to the first to third embodiments, the apparatus is set such that the resolution changeover request can be accepted until the vertical sync timing for the page to be printed. The resolution changeover processing is executed at a timing other than the period of time of the image printing operation. Further, if the changeover processing is not completed at the time point when the vertical sync timing has come or if an image of the preceding page is being printed, by providing a function to stop the paper conveyance at that position, the resolution change-over can be flexibly performed and the decrease in throughput upon switching of the resolution can be minimized.

(Fourth embodiment)

The fourth embodiment according to the invention will now be described hereinbelow with reference to FIGS. 7 to 10.

Figure 7:
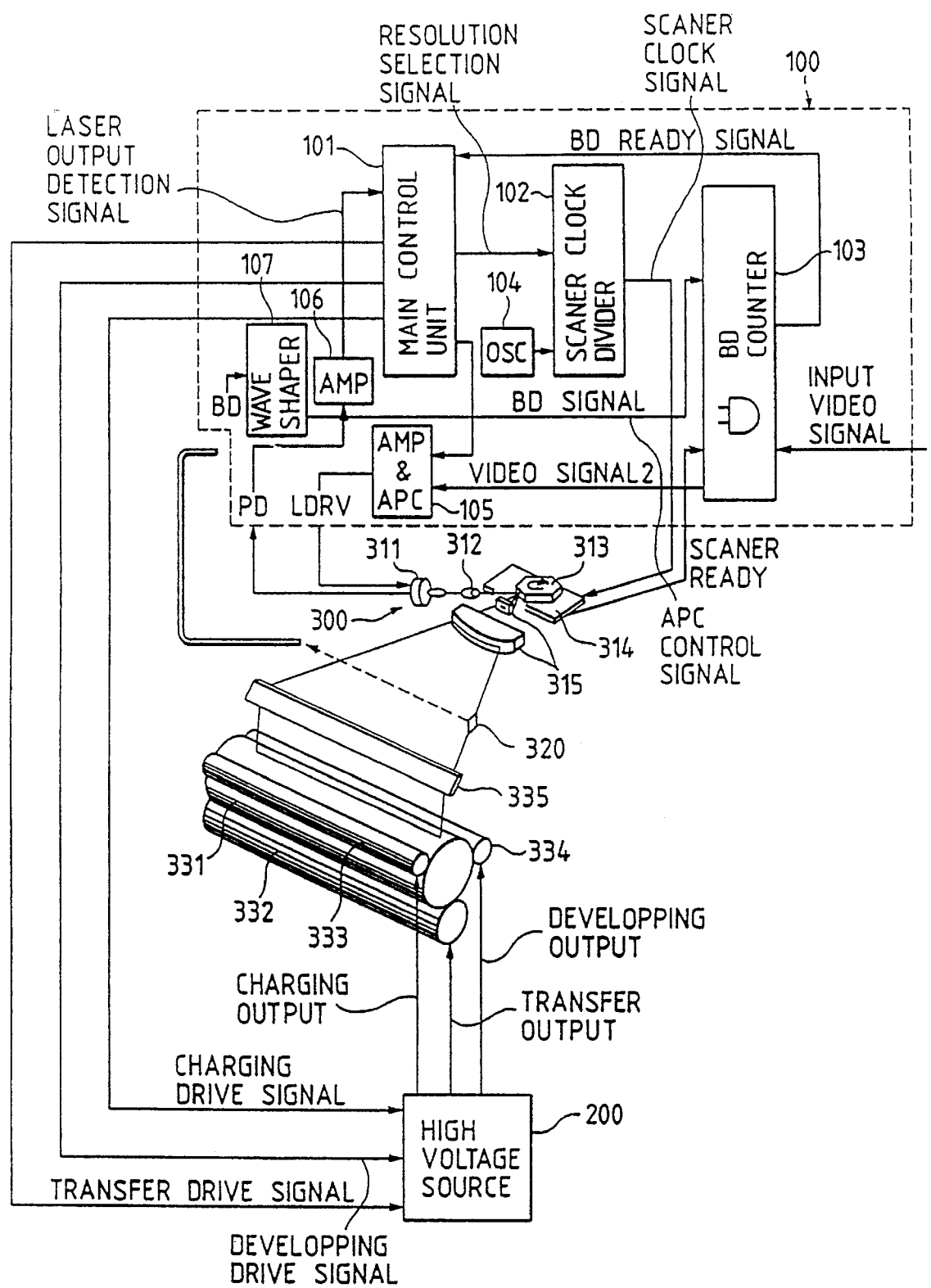
FIG. 7 is a block diagram showing the fourth embodiment according to the invention.

FIG. 7 is a diagram showing a structural conceptual construction of a recording section of a laser beam printer (hereinafter, referred to as an "LBP") based on the electrophotographic method in which the laser beam in the fourth embodiment is used as exposing means according to the invention.

In FIG. 7, reference numeral 100 denotes a controller unit; 200 indicates a high voltage power source; 300 a laser unit; 311 a collimating lens; 312 a cylindrical lens; and 313 a polygon mirror. In the embodiment, a hexahedron mirror is used as a polygon mirror. Reference numeral 314 denotes a scanner motor to rotate the polygon mirror 313; 315 an image forming lens; 320 a BD mirror; 331 a photo sensitive drum; 332 a transfer roller; 333 a charging roller; 334 a developing cylinder; and 335 a reflecting mirror.

In the controller unit 100, a reference numeral 101 denotes a main control unit; 102 a scanner clock frequency divider to control a rotational speed of the scanner motor 314 in correspondence to a resolution selection signal; 103 a BD counter; 104 an oscillator; 105 an amplifier serving as a laser driver for amplifying an APC control signal and a video signal and for emitting a laser beam; 106 an amplifier to amplify a PD signal in association with the laser emission; and 107 a waveform shaper to shape a waveform of the BD signal.

Figure 8:
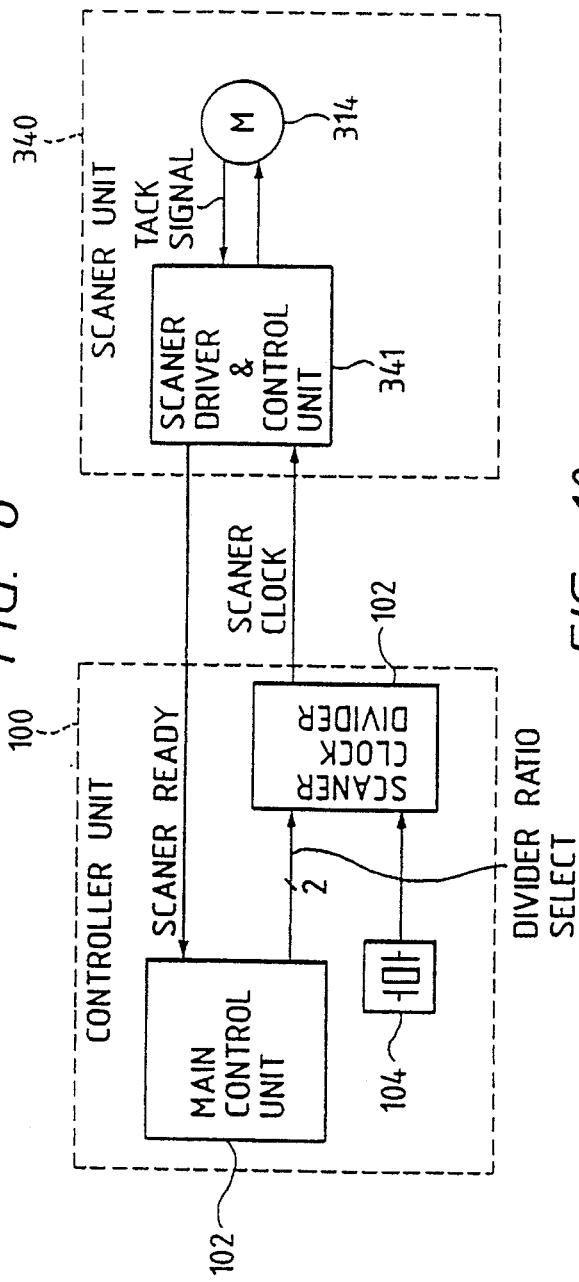
FIG. 8 is a diagram showing the details of the relation between a controller unit and a scanner unit in the fourth embodiment.

FIG. 8 shows the details of the relation between the controller unit 100 and a scanner unit 340 in FIG. 7. In FIG. 8, the parts and components similar to those in FIG. 7 are designated by the same reference numerals and their detailed descriptions are omitted.

In the diagram, reference numeral 340 denotes the scanner unit having a scanner driver and control unit 341.

The scanner clock divider 102 of the controller unit 100 frequency divides a reference signal from the oscillator 104 comprising a crystal oscillator in accordance with a divider ratio selection signal from the main control unit 101, thereby forming a scan clock signal and outputting to the scanner unit 340. In the embodiment, the divider ratio selection signal is constructed by two bits and a total of four kinds of rotational speed changeover signals can be output. However, the rotational speeds which can be switched S are not limited to the above example. It will be obviously understood that a further larger number of bits are assigned to the divider ratio selection signal, thereby enabling an arbitrary kind of rotational speed to be selected and making it possible to record and output at a number of kinds of resolutions.

In the scanner driver control unit 341, the scanner motor 314 is rotated at a rotational speed corresponding to a scanner clock signal from the scanner clock divider 102. The scanner clock signal is compared with a tach signal which is produced due to the rotation of the scanner motor 314 as a reference signal of a phase locked loop (PLL) for the scanner clock signal. The rotation of the scanner motor 314 is controlled so that both of the scanner clock signal and the tach signal always coincide. Thus, the constant speed control of the scanner motor 314 corresponding to a desired resolution can be executed.

The operation control of the embodiment having the above construction will now be described hereinbelow. The control timings of the embodiment which will be explained hereinafter are shown in a timing chart of FIG. 9.

Since the recording apparatus has a construction such that the rotational speed of the scanner motor 314 can be changed in accordance with a desired resolution, the resolution (recording density) can be arbitrarily set. For instance, the resolution changeover such as 240 dpi ⇆ 300 dpi, 300 dpi ⇆ 400 dpi, or the like can be executed by the same apparatus.

During the rotation of the scanner motor 314, if a new resolution is set and input by an external control unit, an operation panel, or the like (not shown), the main control unit 101 outputs a corresponding resolution changeover signal according to the set input to the scanner clock divider 102. Due to this, the scanner clock divider 102 changes the scanner clock signal and the rotational speed of the scanner motor 314 is changed. In addition to it, a scanner ready signal indicating that the scanner motor 314 is rotating at a predetermined constant rotational speed is set to be false (not ready). Further, at this time, the laser output is inhibited and the rotational speed of the scanner motor 314 is also being changed, so that no BD signal is detected and the BD not-ready state is set. The whole LBP apparatus of the embodiment is set into the not-ready state and the printer ready signal is set to be false. At the same time, an input video signal from the external control unit or the like is masked by an AND circuit (not shown) in the BD counter 103 and a laser diode enable signal is produced.

On the other hand, at this time, since the image formation before the resolution is changed has been completed, a development/transfer output is set to the off state. However, the developing/transfer system of the embodiment uses an image forming process by the roller charging/transfer operation. Particularly, a voltage within range about from— hundreds of V to −1 kV (in the embodiment, −1 kV) is applied as a transfer output in order to clean the transfer roller. Therefore, even if the development/transfer output is in the off state, the toner deposited onto the transfer roller can be transferred onto the photo sensitive drum 331.

The scanner driver control unit 341 changes the rotational speed of the scanner motor 314 in correspondence to the scanner clock signal, thereby controlling the rotational speed to a predetermined rotational speed which is specified by the resolution changeover signal (divider ratio selection signal). When the scanner motor has reached a predetermined constant speed state, a scanner ready signal is set to "1" (ready).

Upon reception of the scanner ready signal of the "1" level, the main control unit 101 executes the following control to the transfer output at least after the development output was turned off (after the off state was confirmed).

In a manner similar to the foregoing transfer output, the cleaning sequence using the voltage of about—hundreds of V to −1 kV is continued.

Subsequently, a predetermined positive side bias voltage smaller than an ordinary transfer output is applied. Particularly, this method is an effective way to erase a trace of the recording medium and is used to equalize impedances between the photo sensitive drum 331 and the transfer roller 332 in the cases where the recording medium exists and where it does not exist. Such a bias voltage $V_{t0}$ is determined by a mechanism and a construction of the LBP. In the embodiment, $V_{t0}$ is set to about 2 kV which is equal to the half voltage of the ordinary transfer output. However, such a voltage value is not limited to the above value but depends on the environmental conditions, particularly, the humidity or characteristics of the recording medium. It is desirable to set the optimum voltage value by using those condition values as parameters. For example, it is also possible to automatically adjust the voltage value to a desired predetermined transfer voltage value on the basis of the humidity information. On the other hand, with respect to the recording medium, particularly, a using style of special papers by the hand-insertion paper feeding mode is also considered. In this case, by transmitting recording medium information through the operation panel, host computer, or the like, the voltage value can be also automatically adjusted in a manner similar to that mentioned above.

After the transfer output was set, the laser diode enable output is made active.

Then, in order to obtain the BD signal serving as a horizontal sync signal, the amplifier 105 is energized and the laser is turned on. Thus, the laser beam is led to the BD detector through an optical fiber by the BD mirror 320. The waveform of the laser beam is shaped by the wave shaper 107. After that, the laser beam is sent to the BD counter 103 and the BD signal is detected. After the BD signal was detected, the exposure is executed until the pulses of the number corresponding to at least two lines (two main scanning operations) are counted in order to discriminate whether the BD period is correct or not. Thus, the laser beam is irradiated onto the photo sensitive drum 331 (into the image area).

However, as mentioned above, since the development output is set to the off state at this time point, no latent image is produced on the photo sensitive drum 331. In the embodiment, the sequence to clean the transfer output is further executed, thereby making it difficult to transfer the toner to the transfer roller.

Consequently, the clean state can be held for a long time.

In FIG. 9, t denotes a time when the BD sync signal becomes effective after the laser beam was irradiated onto the drum 331 and a time corresponding to at least one or more rotations of the transfer roller 332 after the latent image formed within the above time has passed through a transfer contact with the transfer roller 332.

Figure 10:
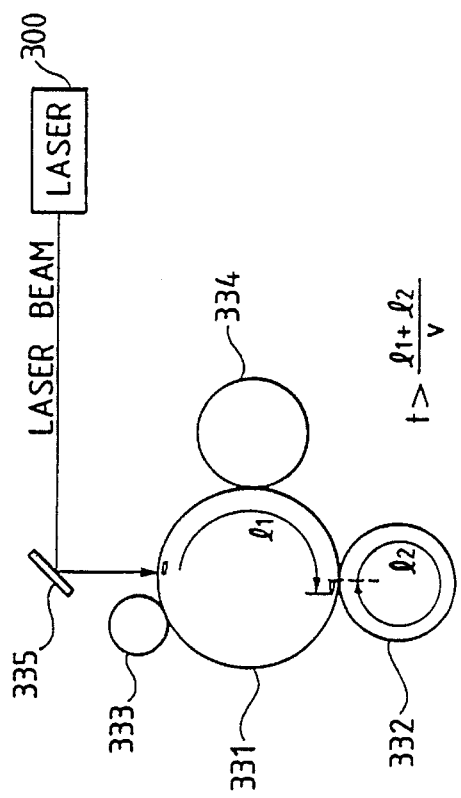
FIG. 10 is a diagram showing the relations among the respective sections in a recording unit in a cleaning sequence for a transfer output in the fourth embodiment.

FIG. 10 shows the relations among the time when the BD sync signal became effective after the laser beam had been irradiated to the photo sensitive drum 331 in the cleaning sequence of the transfer output and the respective sections at the time t until the transfer roller 332 rotates at least one or more number of times after the latent image produced within the above time passed through the transfer contact with the transfer roller 332. In the diagram, V indicates a peripheral velocity of the photo sensitive drum 331 (or transfer roller 332).

After the time t elapsed after the BD signal had been made ready, the printer ready signal is set to "1", thereby setting the printer to the ready state.

After that, the ordinary print sequence is again started by a print signal from the outside.

The above description has been made for the transfer output in the case where the print signal is immediately output after completion of the printer ready operation. If the print signal is not output even after the elapse of a predetermined time, the transfer output is biased to a negative potential and the cleaning sequence is started.

As described above, according to the fourth embodiment, when the rotational speed of the scanner motor 314 is switched, the formation of the unnecessary electrostatic latent image which is caused when the laser beam was continuously emitted to obtain the BD signal as a horizontal sync signal can be effectively prevented.

(Fifth embodiment)

Although the above description has been made with respect to an example in which the developing/transfer system uses the image forming process by the roller charging/transfer operation, the invention is not limited to the above example but can be also applied to the electrophotographic process in which the developing/transfer system is charged by a charger construction.

Figure 11:
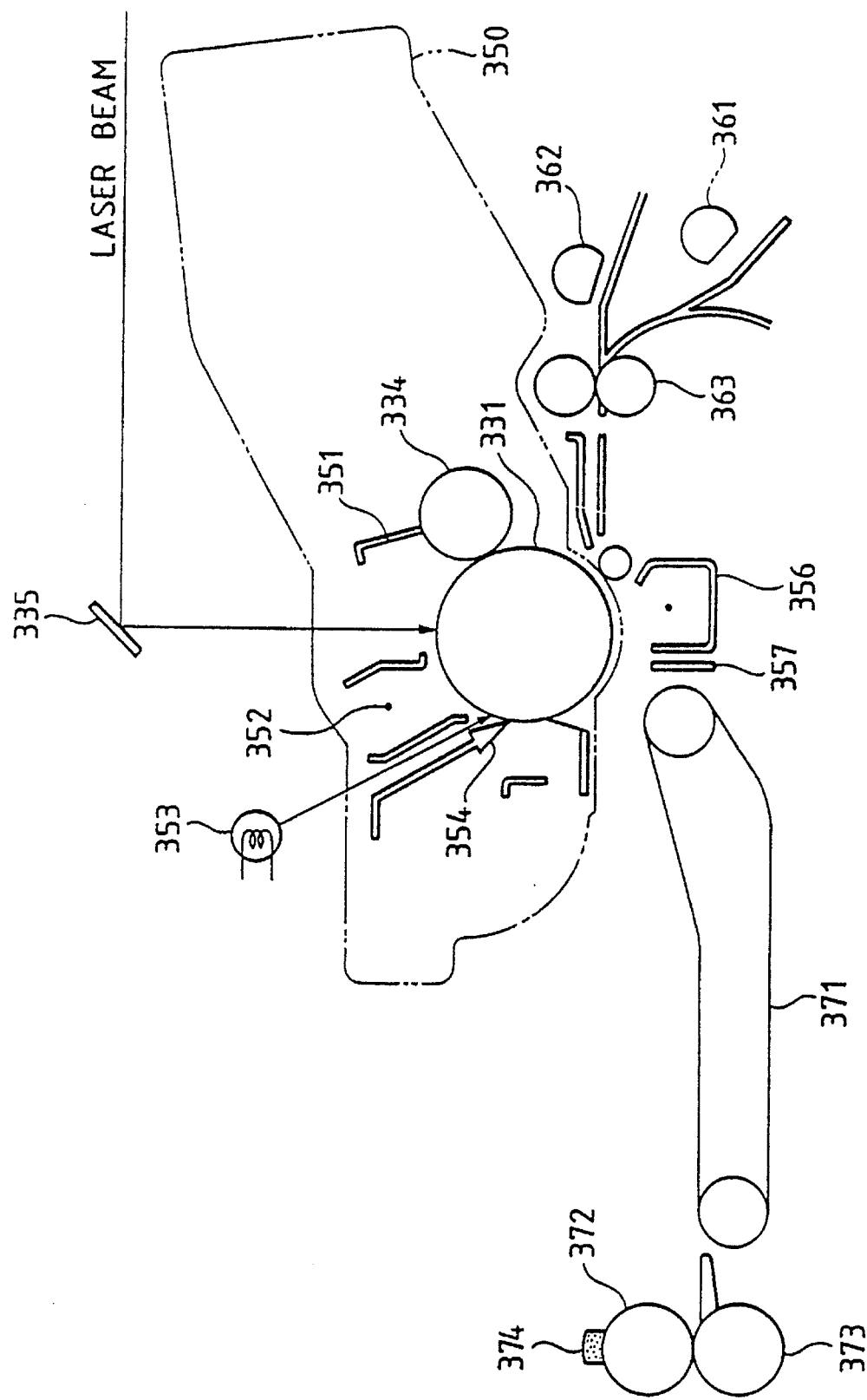
FIG. 11 is a block diagram showing the fifth embodiment according to the invention.

FIG. 11 shows a constructional diagram of an LBP in the fifth embodiment according to the invention in the case where the developing/transfer system was realized by the electrophotographic process by the charging by the charger construction.

In the fifth embodiment, a construction other than the developing/transfer system is similar to the fourth embodiment and the detailed description of the similar construction is omitted.

A cartridge 350 shown in FIG. 11 is a unit which can be integratedly exchanged. In the cartridge unit 350, reference numeral 351 denotes a blade; 352 indicates a primary charger; 353 a pre-exposing lamp; and 354 a cleaner blade. The cartridge unit 350 also has the photo sensitive drum 331 and the developing cylinder 334.

A transfer charger 356 and a deelectrifying needle 357 are also arranged below the photo sensitive drum 331 of the cartridge 350. An electrostatic latent image formed on the drum 331 is copy transferred onto a recording paper which was conveyed by being synchronized by resist rollers 363.

Further, reference numeral 361 denotes a lower stage paper feed roller and 362 indicates an upper stage paper feed roller. The rollers 361 and 362 are used to feed the recording papers set in a lower or upper stage cassette (not shown) one by one. Reference numeral 363 indicates the resist rollers to adjust the conveying timing of the recording paper which was fed; 371 indicates a conveying guide portion to convey the recording paper on which the electrostatic latent image was transferred to a position between an upper fixing roller 372 and a lower fixing roller 373; and 374 represents a cleaner of a fixing device.

When the developing/transfer system as mentioned above is constructed by the electrophotographic process by the charging by a charger construction, the printer can be immediately made ready at the time of the BD ready after completion of the conversion of the rotational speed of the scanner motor 314. The printer ready signal can be soon set to "1".

Even in this case, when the rotational speed of the scanner motor 314 is changed, at least the developing output is set to the off state in a manner similar to the fourth embodiment.

The transfer output is also set to the off state. Even in this case, for the purpose of a countermeasure for the remaining paper trace, it is also possible to apply the transfer output of $V_{t1}$ to the transfer charger 356 so as to be equalized with the impedance at the time when the recording paper exists in the portion of the transfer charger 356.

Further, the transfer output $V_{t1}$ can be also considered as a sum of energies. The voltage $V_{t1}$ can be also pulse width modulated and output.

Figure 12:
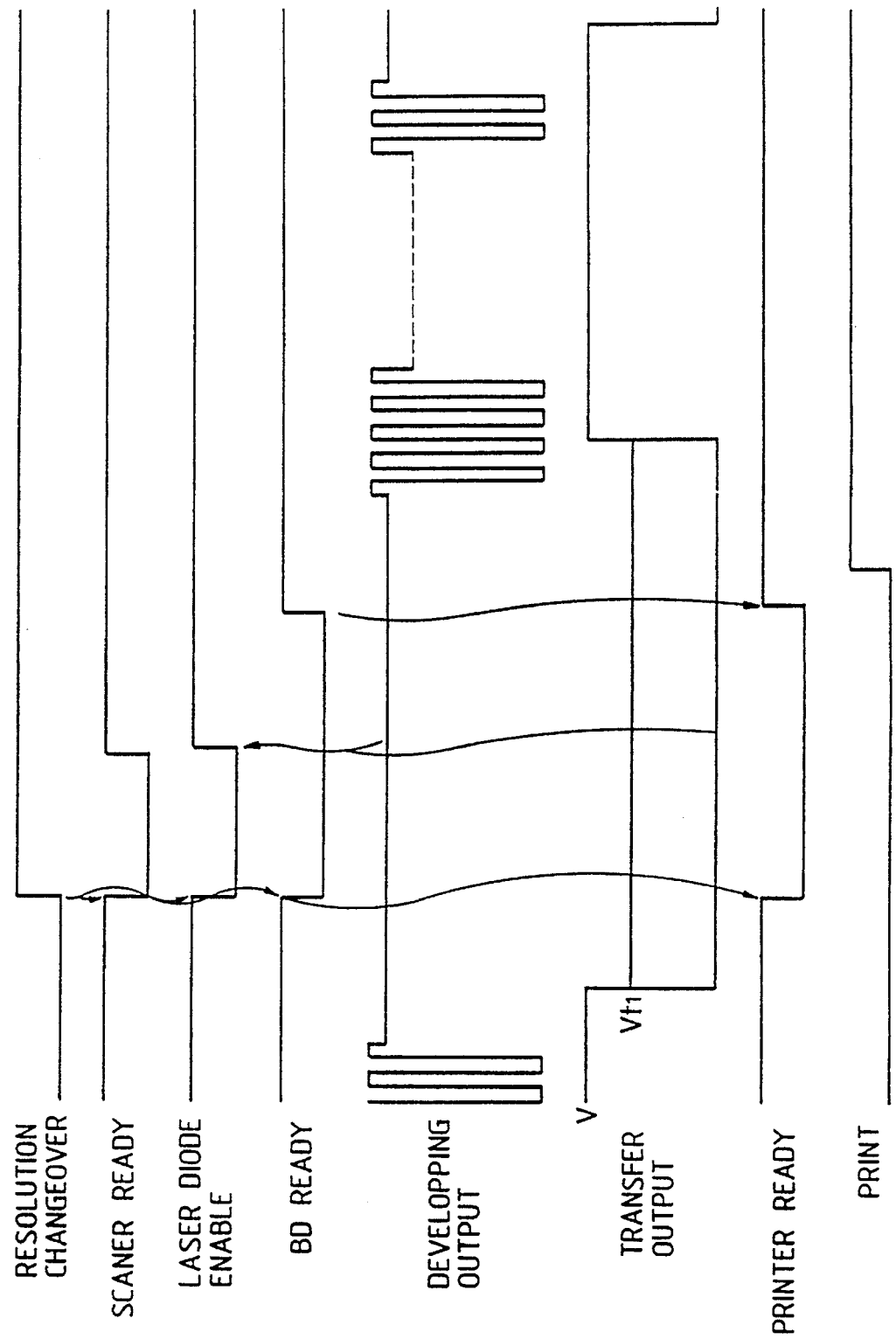
FIG. 12 is an operation timing chart in the fifth embodiment.

FIG. 12 shows a cleaning timing of the portion of the transfer charger 356 in the fifth embodiment and subsequent control timings.

Even in the fifth embodiment, in a manner similar to the fourth embodiment, as shown in FIG. 12, when the rotational speed of the scanner motor 314 is switched, the formation of the unnecessary electrostatic latent image which is caused when the laser beam was continuously emitted to obtain the BD signal as a horizontal sync signal can be effectively prevented.

As described above, according to the fourth and fifth embodiments mentioned above, the copy transfer of the unnecessary electrostatic latent image after the resolution was switched in the LBP can be prevented and the following effects are obtained.

(1) A buildup of dirt by the toner of the transfer roller 332 in the roller transfer system can be prevented.

(2) A dirt by the toner of the transfer charger 356 can be prevented.

Thus, a "back surface dirt" of the paper is eliminated and an image of a high quality without any dirt can be also provided even in the both-sided printing mode.

(Sixth embodiment)

Figure 13:
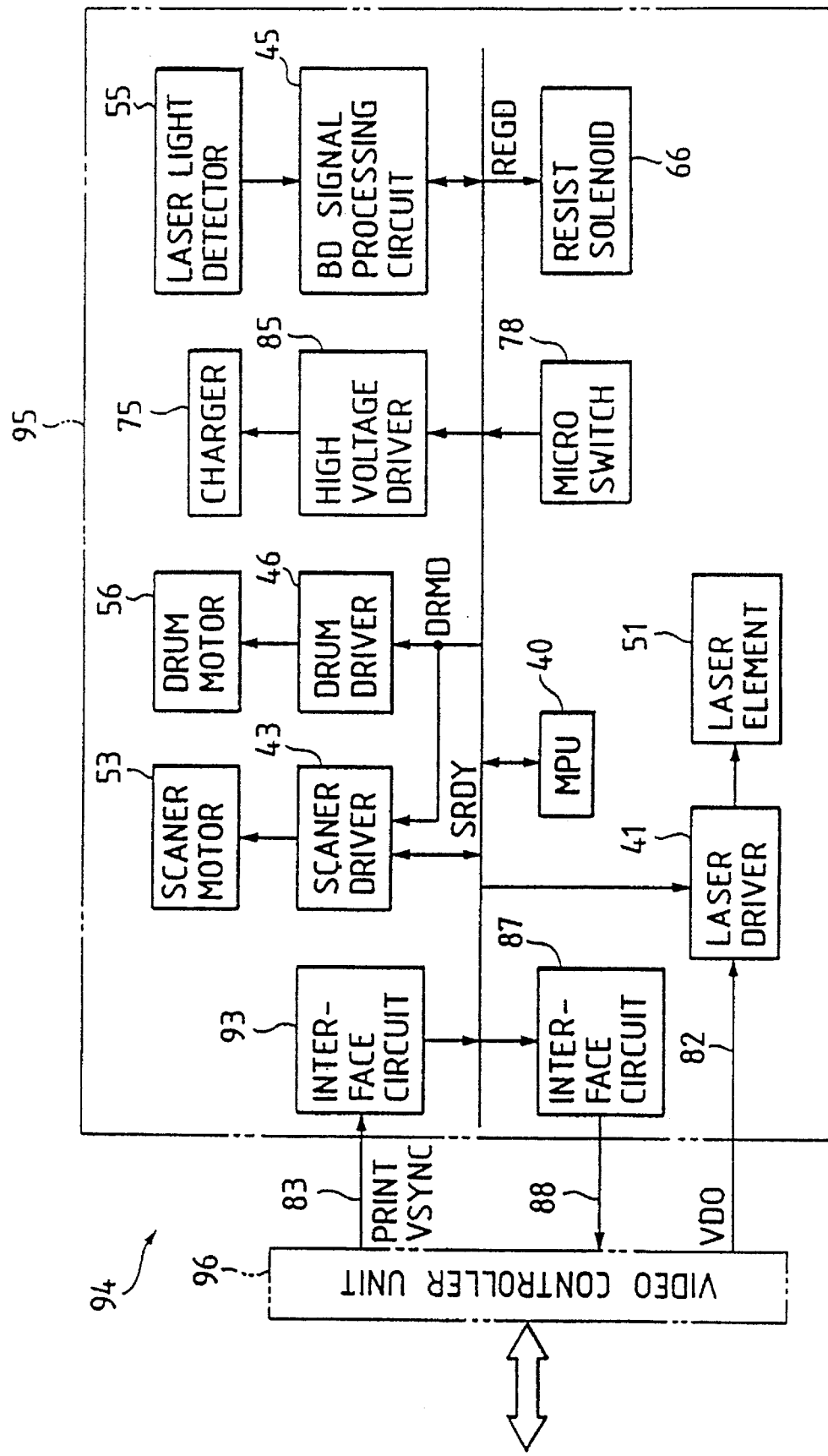
FIG. 13 is a block diagram showing an electrical arrangement of the sixth embodiment according to the invention.
Figure 14:
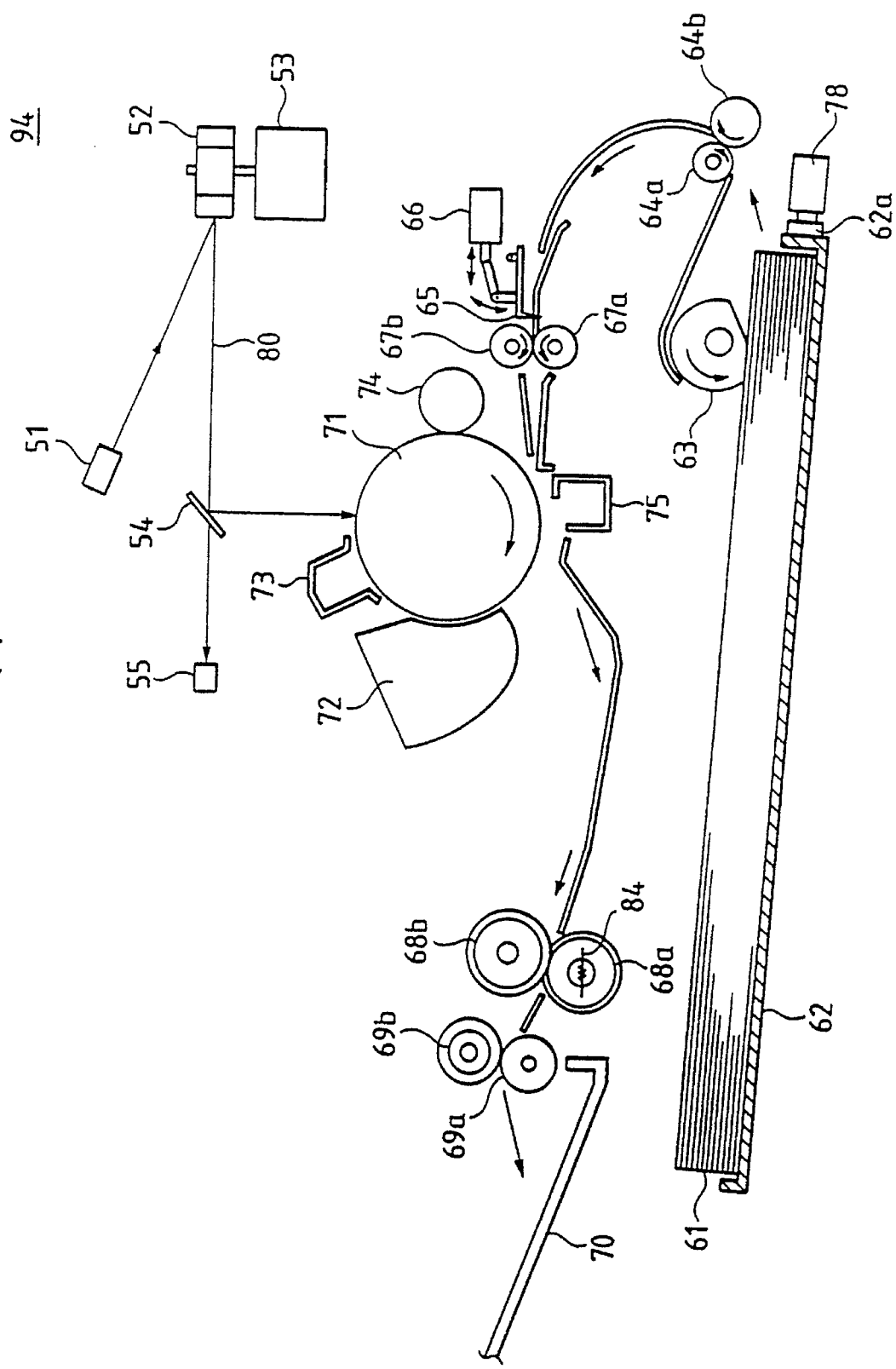
FIG. 14 is a diagram showing a construction of a printer engine section of the sixth embodiment.

FIG. 13 is a block diagram showing an electrical construction of a laser printer 94 including a printer engine unit 95 as a printing apparatus according to the sixth embodiment of the invention. FIG. 14 is a cross sectional view simply showing a construction regarding the printing operation of the laser printer 94. Explanation will now be made hereinbelow with reference to FIGS. 13 and 14. The laser printer 94 has, for instance, a video controller unit 96. The print data which is output from an external computer or the like is converted into an image signal by the video controller unit 96.

Reference numeral 51 denotes a laser element such as a laser diode or the like. The laser element 51 is turned on and off on the basis of an image signal VDO which is given from the video controller unit 96 to the laser driver 41 through a line 82. At this time, the video controller unit 96 switches an output speed of the image signal VDO and outputs on the basis of the set resolution.

On the other hand, various command signals including the designation of the resolution, change thereof, and the like are input from the video controller unit 96 to a microprocessor (hereinafter, referred to as an "MPU") 40 as control means through a line 83 and an interface circuit 93. On the other hand, internal status information in the printer engine unit 95, error message which will be explained hereinlater, and the like are output to the video controller unit 96 via an interface circuit 87 and a line 88.

A laser beam from the laser element 51 passes through a collimating lens and a cylindrical lens (not shown) and is reflected to a rotary polygon mirror 52. A scanner driver 43 controls a scanner motor 53 on the basis of a signal from the MPU 40, so that the rotary polygon mirror 52 is rotated at a rotational speed corresponding to the set resolution. A laser beam 80 which was reflected by the mirror 52 is reflected by a reflecting mirror 54 and scans on a photo sensitive drum 71. A BD signal processing circuit 45 outputs a BD signal to specify a writing timing of an image in the main scanning direction to the MPU 40 on the basis of a detection signal from a laser photo detector 55 arranged at the scan start position of the laser beam 80.

At this time, the photo sensitive drum 71 is driven at a predetermined rotational speed by a drum motor 56 and a drum driver 46 irrespective of the set resolution. The surface of the drum 71 has uniformly been charged by a corona discharge of a primary charger 73. Therefore, an electrostatic latent image is formed by scanning and exposing the drum 71 by the laser beam 80. The electrostatic latent image is developed to a toner image by a developing unit 74 and is copy transferred onto a recording paper 61 as will be explained hereinlater. Reference numeral 72 denotes a cleaner to clean the photo sensitive drum 71.

A construction to convey the recording paper 61 will now be described. Reference numeral 62 denotes a cassette to enclose the recording papers 61. A plurality of kinds of cassettes 62 are prepared in accordance with the sizes of recording papers 61 to be enclosed. One or a plurality of projection portions 62a are formed at a predetermined position(s) in the direction perpendicular to the paper surface in the right edge portion of FIG. 14 of the cassette 62 in accordance with the size of recording paper 61 to be enclosed. When the cassettes 62 are attached to the laser printer main body, the projecting portions 62a selectively push a plurality of micro switches 78 provided for the laser printer 94. Due to this, the laser printer 94 recognizes the sizes of recording papers 61. That is, detecting means for detecting the sizes of recording papers 61 is constructed by including the projecting portions 62a and micro switches 78.

Reference numeral 63 denotes a paper feed cam to feed the recording papers 61 enclosed in the arbitrary one of the cassettes 62 one by one. The recording paper 61 is conveyed to the position of paper feed rollers 64a and 64b by the paper feed cam 63. Reference numeral 65 denotes a resist shutter to stop the recording paper 61 which is conveyed by the rotations of the rollers 64a and 64b. At this time, the paper feed rollers 64a and 64b continue the rotations while slipping for the recording paper 61. When a resist solenoid 66 is driven synchronously with the timing of the image formation onto the photo sensitive drum 71 and the resist shutter 65 is released upward in FIG. 2, the recording paper 61 is conveyed to the drum 71 by the paper feed rollers 64a and 64b and conveying rollers 67a and 67b.

Reference numeral 75 denotes a transfer charger which is driven by a high voltage driver 85 on the basis of a signal from the MPU 40 and the toner image on the drum 71 is transferred onto the recording paper 61 as mentioned above. Reference numerals 68a and 68b denote fixing rollers to thermally fix a toner image on the recording paper 61. Reference numeral 84 denotes a heater to raise the temperature of the surface of the fixing roller 68a to a predetermined temperature. The recording paper 61 printed as mentioned above is delivered onto a stacker 70 by delivery rollers 69a and 69b.

The characteristic operation of the laser printer 94 with the above construction will now be described with reference to flowcharts of FIGS. 15 and 16.

Figure 15:
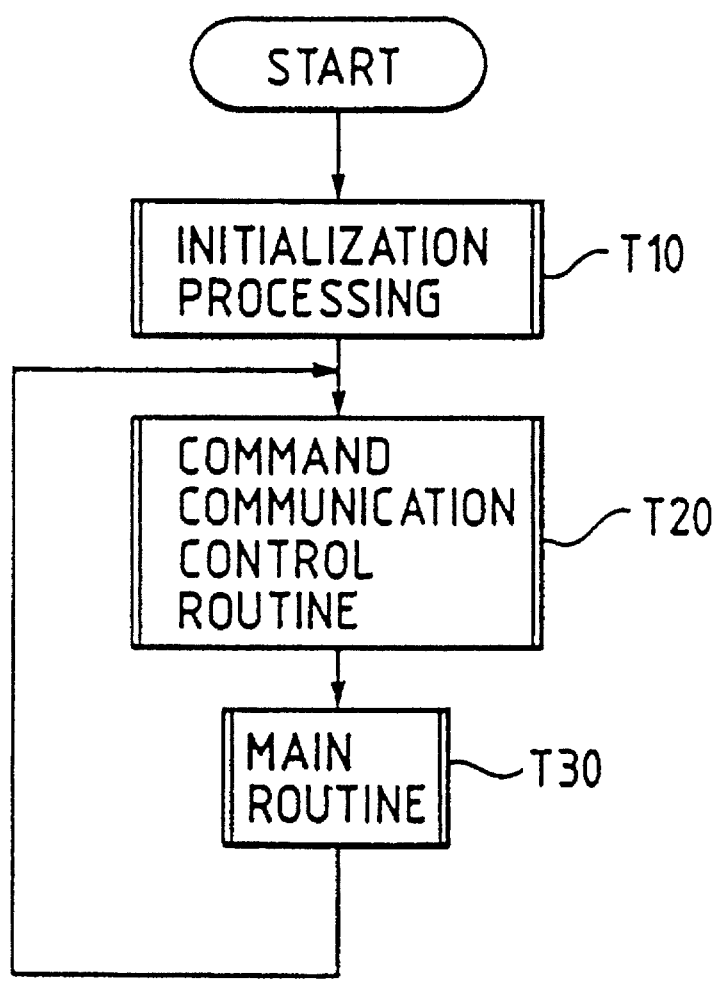
FIGS. 15 and 16 are control flowcharts of the sixth embodiment.
Figure 16:
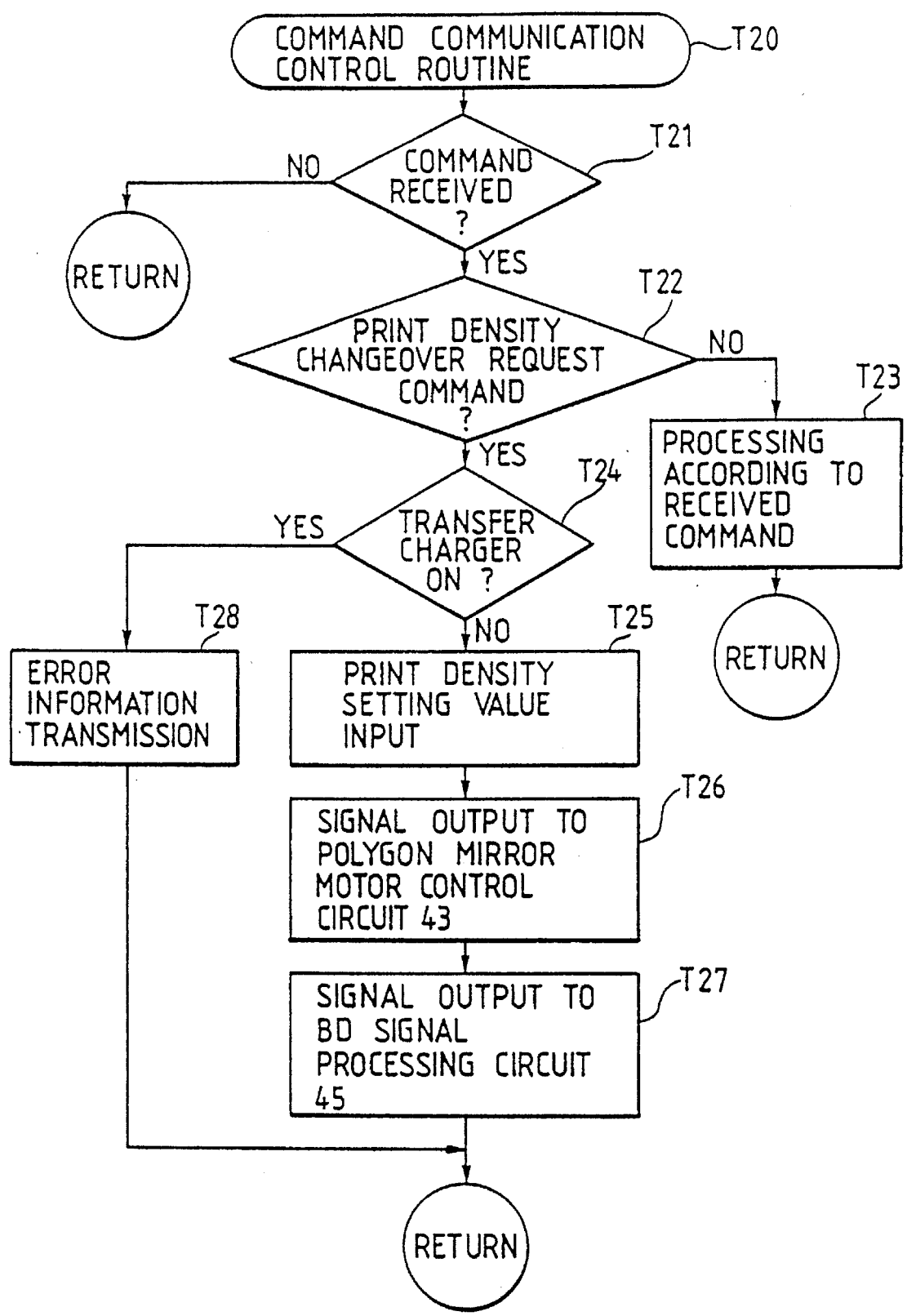

When a power source of the laser printer 94 is turned on, step T10 in FIG. 15 is first executed and the initialization processings such as to initialize the content of a random access memory provided in the MPU 40 and the like and to rotate the rotary polygon mirror 52 and the like are executed. At this time, the size of recording paper 61 is recognized by the signals from the micro switches 78. In step T20, a communication processing of a printer control command and the like are executed with the video controller unit 96. That is, as will be explained hereinlater, a command communication control routine is executed and when a command is received, interpretation and return processings of the command or a processing corresponding to the command received is executed. In the main routine in step T30, the well-known control of the printer and the like are executed.

A changing operation of the resolution in the command communication control routine shown in step T20 will now be described with reference to FIG. 16. First, in step T21, a check is made to see if a printer control command has been sent from the video controller unit 96 or not. If NO, the processing routine is returned. When the printer control command is received, a check is made in step T22 to see if the received command is a resolution changeover request command or not. If a command other than the resolution changeover request command has been received, in step T23, the MPU 40 interprets various kinds of received commands and executes processings corresponding to the commands such as to drive a group of various devices such as primary charger 73 laser element 51, and the like through device drivers and the like.

For instance, when a print command is input, the drum motor 56 is driven through the drum driver 46 and the primary charger 73 is also made operative.

On the other hand, if a print density changeover request command has been received in step T22, a check is made in step T24 to see if the transfer charger 75 has been turned on or not. If YES, step T28 follows and error information is transmitted from the printer engine unit 95 to the video controller unit 96. The error information is output as one of status information for, e.g., the resolution changeover request command. Due to this, the video controller unit 96 can recognize the fact that the switching of the print density in the printer engine unit 95 was not executed.

Upon reception of the error information, the video controller unit 96 informs the fact to an external computer or the like or again transmits the resolution changeover request command, for instance, after the transfer charger 75 was turned off, thereby switching the resolution for the next and subsequent pages. Or, even in the case of continuously printing a plurality of pages, the printing operation of the next and subsequent pages is temporarily stopped and a proper processing can be performed. On the other hand, in a construction such that the video controller unit 96 is omitted and the processings which are executed by the video controller unit 96 are performed by an external apparatus, the above proper processing is executed on the basis of a software provided in the external apparatus such as a computer or the like.

On the other hand, if the transfer charger 75 is in the off state in step T24, step T25 follows and a signal indicative of the resolution from the video controller unit 96 is received. In the case where a setting value of the print density has been stored in the MPU 40 and the resolution is switched, the content is updated to the received setting value.

After a calculation processing, which will be explained hereinlater, was subsequently executed, in step T26, a signal is output to the scanner driver 43 and the polygon mirror 52 is rotated at a rotational speed corresponding to the set resolution. Thus, the resolution in the sub scanning direction is changed.

For instance, it is now assumed that a rotational speed of the rotary polygon mirror 52 at a resolution of 240 dpi is set to $R_A$, a frequency of video clocks is set to $F_A$, a rotational speed of the mirror 52 at a resolution of 300 dpi is set to $R_B$, and a frequency of video clocks is set to $F_B$. In this case, there are the following relations.

$$R_B = \frac{300}{240} \times R_A, \quad F_B = \left(\frac{300}{240}\right)^2 \times F_A$$

In the case of changing the resolution, for instance, from 240 dpi to 300 dpi by the resolution changeover request command, the above calculations are executed by the MPU 40 and the rotational speed $R_B$ is output to the scanner driver 43.

On the other hand, the frequency $F_B$ of the video clocks of the image signal indicative of the resolution in the main scanning direction is determined by the video controller unit 96 so as to satisfy the above equations.

In step T27, in association with the change of the rotational speed of the polygon mirror 52, to change the output timing of the BD signal, data corresponding to the resolution is given to the BD signal processing circuit 45.

FIG. 17 is a timing chart for explaining the operation timings in the printing operation. When a signal PRINT rises at time $t_1$ as a print command, the MPU 40 receives it and sets a signal DRMD to a high level and makes the scanner motor 53 and drum motor 56 operative. After the elapse of a predetermined period $W_1$, the primary charger 73 is turned on. When the rotation of the scanner motor 53 becomes stable, a signal SRDY is set to the high level. Upon completion of the print ready state, the printer engine unit 95 generates a VSYNC request signal. After the elapse of a predetermined time $W_2$ after the vertical sync signal VSYNC had been output from the video controller unit 96, an image signal VDO is output. Synchronously with the vertical sync signal VSYNC, the resist shutter 65 is released and the transfer charger 75 is activated and the like. A release period of the resist shutter 65, an ON period $W_4$ of the transfer charger 75, and the like are set in correspondence to the size of the recording paper 61 which was detected as mentioned above.

In the sixth embodiment, as in the above description of the operation, the MPU 40 outputs the error information without switching the resolution in response to the resolution. changeover request command in the ON period $W_4$ of the transfer charger 75. Since the on/off control of the transfer charger 75 is executed by the MPU 40, the MPU 40 recognizes the on/off state of the transfer charger 75. Therefore, the above operation can be realized by merely changing the software without needing to add a new construction. Moreover, since the period $W_4$ corresponds to the size of recording paper 61, the ineffective period can be set to a proper length and is not set to a long time in vain.

As mentioned above, the sixth embodiment has been described with respect to the case where the period when the error information is output without performing the resolution changeover operation in response to the resolution changeover request command has been set to the period $W_4$ when the transfer charger 75 is in the on state. However, in the invention, the period to output the error information can be also set to, for instance, a period when the video signal of one page is being input or an on period of the primary charger 73 if it is a period corresponding to the size of recording paper 61. The above period can be also set to other period such as a period corresponding to the length in the conveying direction of the recording paper 61 after the conveyance of the recording paper 61 was restarted after the resist shutter 65 had been released.

On the other hand, in place of the resolution changeover request command, only a resolution designation command is used and it is also possible to construct in a manner such that a newly designated resolution and the present resolution are compared and only when they differ, the processing is executed similarly to the resolution changeover request command.

In addition, it is also possible to construct in a manner such that a resolution changeover permission flag is provided and error information is output in response to the resolution changeover request command which was input when the flag is not set to "1".

Further, although the case of the laser printer in which the main scan is performed by using a rotary polygon mirror has been described, the invention can be also similarly embodied even in the case of a printing apparatus such that a latent image is formed onto a photo sensitive material by using an LED array or a liquid crystal shutter or the like.

What is claimed is:

1. An image forming apparatus comprising:

a light beam generator which generates a light beam which is modulated on the basis of image information;

a rotary polygon mirror which scans the light beam from the light beam generator on a photosensitive drum in order to form an eletrostatic latent image on the photosensitive drum, said image forming apparatus performing an image forming operation at one of a plurality of rotational speeds of the rotary polygon mirror;

a developing unit which forms a toner image by developing the electrostatic latent image formed on the photosensitive drum;

a transfer unit which transfers the toner image formed on the photosensitive drum onto a recording medium;

a light beam detecting element which detects the light beam scanned by said rotary polygon mirror in a non-latent image forming region in order to obtain a horizontal sync signal;

forcible light emission means for causing the light beam generator to emit the light beam, so that the light beam is detected by the light beam detecting element; and transfer unit charging means for charging the transfer unit to a second potential during a period when the forcible light emission means is causing the light beam generator to emit the light beam after the rotational speed of the rotary polygon mirror has been changed, wherein the second potential is different than a potential at which the transfer unit is charged when performing a transfer operation.

2. An image forming apparatus according to claim 1, wherein the transfer unit includes a transfer roller.

3. An image forming apparatus according to claim 1, wherein the transfer unit includes a transfer charger.

4. An image forming apparatus according to claim 1, wherein at least the photosensitive drum and the developing unit are enclosed into one cartridge.

5. An image forming apparatus according to claim 1, wherein an operation of switching the rotational speed of the rotary polygon mirror is performed after a recording operation when a designation of changing the rotational speed of the rotary polygon mirror is received during the recording operation.

6. An image forming apparatus according to claim 5, wherein the forcible light emission means causes the light beam generator to emit the light beam in the non-latent image forming region after the light beam was detected by the light beam detecting element.

7. An image forming apparatus according to claim 6, wherein the transfer unit includes a transfer roller.

\* \* \* \* \*